United States Patent
Gong et al.

(10) Patent No.: US 11,545,140 B2
(45) Date of Patent: Jan. 3, 2023

(54) SYSTEM AND METHOD FOR LANGUAGE-BASED SERVICE HAILING

(71) Applicant: BEIJING DIDI INFINITY TECHNOLOGY AND DEVELOPMENT CO., LTD., Beijing (CN)

(72) Inventors: Fengmin Gong, Mountain View, CA (US); Xiulin Li, Beijing (CN)

(73) Assignee: Beijing DiDi Infinity Technology and Development Co., Ltd., Beijing (CN)

(*) Notice: Subject to any disclaimer, the term of this patent is extended or adjusted under 35 U.S.C. 154(b) by 97 days.

(21) Appl. No.: 16/314,455

(22) PCT Filed: Jul. 31, 2017

(86) PCT No.: PCT/CN2017/095331
§ 371 (c)(1),
(2) Date: Dec. 31, 2018

(87) PCT Pub. No.: WO2019/023908
PCT Pub. Date: Feb. 7, 2019

(65) Prior Publication Data
US 2021/0233517 A1 Jul. 29, 2021

(51) Int. Cl.
*G10L 15/16* (2006.01)
*G10L 15/00* (2013.01)
*G10L 15/06* (2013.01)

(52) U.S. Cl.
CPC .......... *G10L 15/16* (2013.01); *G10L 15/005* (2013.01); *G10L 15/063* (2013.01)

(58) Field of Classification Search
CPC ...... G10L 15/16; G10L 15/005; G10L 15/063
(Continued)

(56) References Cited

U.S. PATENT DOCUMENTS 10,403,291 B2 * 9/2019 Moreno ................ G10L 17/22
2006/0053013 A1 3/2006 Aubauer et al.
2008/0021697 A1 1/2008 Cox et al.
(Continued)

FOREIGN PATENT DOCUMENTS

CN 1720570 A 1/2006
CN 102376182 A 3/2012
(Continued)

OTHER PUBLICATIONS

Examination Report No. 2 dated Nov. 26, 2020, issued in related Australian Application No. 2017425736 (6 pages).
(Continued)

*Primary Examiner* — Pierre Louis Desir
*Assistant Examiner* — Nicole A K Schmieder
(74) *Attorney, Agent, or Firm* — Sheppard Mullin Richter & Hampton LLP (57) ABSTRACT

Systems and methods are provided for language-based service hailing. Such system may comprise one or more processors and a memory storing instructions that, when executed by the one or more processors, cause the computing system to obtain a plurality of speech samples, each speech sample comprising one or more words spoken in a language, train a neural network model with the speech samples to obtain a trained model for determining languages of speeches, obtain a voice input, identify at least one language corresponding to the voice based at least on applying the trained model to the voice input, and communicate a message in the identified language.

18 Claims, 5 Drawing Sheets

(58) Field of Classification Search
USPC .......................................................... 704/232
See application file for complete search history.

(56) References Cited

U.S. PATENT DOCUMENTS

| | | | | |
|---|---|---|---|---|
| 2009/0258333 | A1* | 10/2009 | Yu ........................ | G09B 19/06 |
| | | | | 434/157 |
| 2010/0106499 | A1* | 4/2010 | Lubowich ............ | G10L 15/005 |
| | | | | 704/235 |
| 2013/0238336 | A1* | 9/2013 | Sung .................... | G10L 15/005 |
| | | | | 704/255 |
| 2015/0120287 | A1* | 4/2015 | Stern .................... | G10L 15/183 |
| | | | | 704/231 |
| 2016/0035344 | A1 | 2/2016 | Gonzalez-Dominguez et al. | |
| 2017/0243575 | A1* | 8/2017 | Chen .................... | G06N 3/0445 |
| 2018/0314689 | A1* | 11/2018 | Wang ...................... | G10L 15/07 |
| 2019/0103096 | A1* | 4/2019 | Kobayashi ............ | G06F 16/583 |
| 2019/0385589 | A1* | 12/2019 | Muramatsu ........... | G10L 15/005 |

FOREIGN PATENT DOCUMENTS

| | | |
|---|---|---|
| CN | 104462064 A | 3/2015 |
| CN | 105912532 A | 8/2016 |
| CN | 106782501 A | 5/2017 |
| JP | 2001-296882 A | 10/2001 |
| JP | 2006-268710 A | 10/2006 |
| JP | 2010-186317 A | 8/2010 |
| JP | 2010-191530 A | 9/2010 |
| JP | 2016-201033 A | 12/2016 |
| KR | 10-2014-0049922 A | 4/2014 |
| TW | 201426733 A | 7/2014 |
| TW | 201721510 A | 6/2017 |

OTHER PUBLICATIONS

Kong Xu et al., "Convolutional Gated Recurrent Neural Network Incorporating Spatial Features for Audio Tagging", IEEE, 2017, pp. 3461-3466, arXiv:1702.07787v1 [cs.SD] Feb. 24, 2017.

Hrayr Harutyunyan et al., "Combining CNN and RNN for spoken language identification", YerevaNN Blog on neural networks, Jun. 26, 2016 (11 pages).

Examination Report No. 1 dated Aug. 18, 2020, issued in related Australian Application No. 2017425736 (4 pages).

Search Report dated Jan. 8, 2020, issued in related Taiwanese Application No. 107126575 (1 page).

Examination Report No. 3 dated Feb. 2, 2021, issued in related Australian Application No. 2017425736 (6 pages).

Examination Report dated Feb. 3, 2021, issued in related European Application No. 17920512.5 (6 pages).

Notice of Reasons for Refusal dated Jan. 18, 2021, issued in related Japanese Application No. 2019-572145, with English machine translation (13 pages).

Trung Ngo Trong et al., "Deep Language: a comprehensive deep learning approach to end-to-end language recognition", Odyssey 2016, Jun. 21-24, 2016, Bilbao, Spain, pp. 109-116.

PCT International Search Report and the Written Opinion dated Apr. 25, 2018, issued in related International Application No. PCT/CN2017/095331 (7 pages).

PCT International Preliminary Report on Patentability dated Feb. 13, 2020, issued in related International Application No. PCT/CN2017/095331 (6 pages).

Extended European Search Report dated Mar. 6, 2020, issued in related European Patent Application No. 17920512.5 (8 pages).

Decision of Refusal dated May 31, 2021, issued in related Japanese Application No. 2019-572145, with English machine translation (9 pages).

"ATR Natural Speech Database SDB Japanese Transcription Data (Sample)", [online], Jun. 19, 2015, [May 11, 2021 Search], Internet<URL: https://web.archive.org/web/20150619002744/http://www.atr-p.com/products / dbsample / sdb_jtext.txt>.

ATR Naturally Spoken Speech Language Database SLDB English Transcription Data (Sample), [online], Jan. 8, 2017, [May 11, 2021 Search], Internet<URL: https://web.archive.org/web/20170108181315/http://atr-p.com/products / dbsample / sldb_etext.txt>.

\* cited by examiner

SYSTEM AND METHOD FOR LANGUAGE-BASED SERVICE HAILING

CROSS REFERENCE TO RELATED APPLICATION

This application is a national phase application of International Application No. PCT/CN2017/095331, filed on Jul. 31, 2017, and entitled "System And Method For Language-Based Service Hailing," the entire contents of which are incorporated herein by reference.

FIELD OF THE INVENTION

This disclosure generally relates to approaches and techniques for language detection and service hailing.

BACKGROUND

Current technologies are inadequate to provide multilingual support. The problem arises in many applications, such as online platforms for providing services or goods to people of various language backgrounds and prowess. It is challenging to automatically determine the most appropriate language for offering personalized services.

SUMMARY

Various embodiments of the present disclosure can include systems, methods, and non-transitory computer readable media configured to perform language-based service hailing. A computing system for language-based service hailing may comprise one or more processors and a memory storing instructions. The instructions, when executed by the one or more processors, may cause the computing system to obtain a plurality of speech samples, each speech sample comprising one or more words spoken in a language, train a neural network model with the speech samples to obtain a trained model for determining languages of speeches, obtain a voice input, identify a language corresponding to the voice based at least on applying the trained model to the voice input, and communicate a message in the identified language.

In some embodiments, to train the neural network model, the system may be caused to convert the speech samples to spectrograms and train the neural network model with the spectrograms.

In some embodiments, the neural network model may comprise a convoluted neural network (CNN) configured to transform the voice input by multiple layers to determine its language. The neural network model may further comprise one or more Gated Recurrent Units (GRUs) applied to each channel output of the CNN.

In some embodiments, before identifying the language corresponding to the voice, the computing system may be further caused to obtain at least one of an image or a video of a user associated with the voice input, and determine a first set of candidate languages based on at least one of the image or the video. To identify the language corresponding to the voice based at least on applying the trained model to the voice input, the computing system may be caused to identify the language corresponding to the voice based at least on applying the trained model to the voice input and on the determined first set of candidate languages.

In some embodiments, before identifying the language corresponding to the voice, the computing system may be further caused to obtain a location of a user associated with the voice input, and determine a second set of candidate languages based on the location. To identify the language corresponding to the voice based at least on applying the trained model to the voice input, the computing system may be caused to identify the language corresponding to the voice based at least on applying the trained model to the voice input and on the determined second set of candidate languages.

In some embodiments, the system may be coupled to a computing device, and the computing device may comprise a microphone configured to receive the voice input and transmit the received voice input to the one or more processors.

In some embodiments, the message may comprise at least one of a voice or a text, and to communicate the message in the identified language, the system may be caused to perform at least one of playing the message via the computing device or identifying a person at least knowing the identified language to play the message.

In some embodiments, the computing device may be a mobile phone associated with a user, the system may be a vehicle information platform, and the message may be associated with a vehicle for servicing the user. The voice input may comprise a request for vehicle service, and the message may be associated with a vehicle driver at least knowing the identified language.

In some embodiments, the one or more words comprise one or more phrases for starting a phone call conversation, and the one or more phrases comprise "hi" in various languages.

In some embodiments, a method for language-based service hailing comprises obtaining a voice input, identifying a language corresponding to the voice based at least on applying a trained neural network model to the voice input, and communicating a message in the identified language. The trained neural network model has been trained with a plurality of speech samples to determine languages of speeches, and each of the speech samples comprises one or more words spoken in a language.

In some embodiments, a non-transitory computer-readable medium for language-based vehicle hailing, comprises instructions stored therein. The instruction, when executed by one or more processors, perform the steps of: obtaining a plurality of speech samples, each speech sample comprising one or more words spoken in a language; training a neural network model with the speech samples to obtain a trained model for determining languages of speeches; obtaining a voice input, at least one of an image or a video of a user associated with the voice input, and a location of the user; determining a first set of candidate languages based on at least one of the image or the video and a second set of candidate languages based on the location; and identifying a language corresponding to the voice based at least on applying the trained model to the voice input, on the first set of candidate languages, and on the second set of candidate languages.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

Current technologies are inadequate to provide multi-lingual services. Often users are required to have some basic knowledge of a primary language used by the service provider, whether the service provider is a human, a machine, or a software platform. For example, to request services, such as calling a phone line for technical support, hiring a taxi from the street, or hailing for a ride using an application (APP), the requestor needs to know the main language used by the service provider, or know how to navigate through multi-language selection options if provided at all. However, in cases when people travel to foreign regions using foreign languages or need to request services online from a provider using foreign languages, the existing methods fail to serve those lack basic understanding of the primary language used by the service provider. Thus, online platforms using the existing technologies cannot scale efficiently to expand the services or are at least impeded by the inconvenience or technical difficulty of translation.

Various embodiments described below can overcome such problems arising in the realm of providing multi-lingual services. In various embodiments, a computing system for language-based service hailing may comprise one or more processors and a memory storing instructions. The instructions, when executed by the one or more processors, may cause the computing system to obtain a plurality of speech samples, each speech sample comprising one or more words spoken in a language, train a neural network model with the speech samples to obtain a trained model for determining languages of speeches, obtain a voice input, identify a language corresponding to the voice based at least on applying the trained model to the voice input, and communicate a message in the identified language.

The neural network model may comprise various examples, such as a convoluted neural network (CNN), a recurrent neural network, or a combination of both. The neural network may receive the obtained speech samples (e.g., spectrograms of speeches of known languages). A spectrogram is a visual representation of the frequency spectrum of a sound signal. For example, a record of a speech can be converted to a 2D spectrogram with the x-axis representing the time and the y-axis representing the frequency. Such spectrogram can be used as matrices for further processing and analysis. Each word or phrase of each language as represented in the spectrogram or an alternative representation (e.g., intensity, pitch and intensity, etc.) may correspond to a unique pattern. The training of the model can lead to an accurate identification of the language of the speech based on the pattern analysis.

With the speech samples and their known languages, the neural networks are trained to accurately identify the language based on the spectrograms or an alternative representation through a machine learning process. The CNN model may be configured to transform the voice input by applying multiple layers to determine its language. The neural network model may further comprise one or more Gated Recurrent Units (GRUs) applied to each channel output of the CNN model to further improve the accuracy of the determination.

With a trained neural network model, the system may apply the model to a voice input with an unknown language. In some embodiments, the system may be coupled to a computing device, and the computing device may comprise a microphone configured to receive the voice input and transmit the received voice input to the one or more processors. After identifying the language of the voice input, the system may communicate a message in the identified language to a user by playing the message via the computing device, or by identifying a person at least knowing the identified language to play the message. The message may comprise at least one of a voice or a text.

In some embodiments, the system may be a vehicle information platform. The speech samples may comprise one or more phrases for starting a phone call conversation, such as "hi," "can you hear me," or "good morning," in various languages. The one or more phrases may comprise many more examples depending on the culture and user habits. Thus, training the neural network model with the one or more phrases can allow the model to determine the language of a voice input by only analyzing a reasonable portion thereof (e.g., the beginning of a voice input). Further, the computing device may be a mobile phone associated with a user. The vehicle information platform may be accessible to the mobile phone (e.g., via a website, an application, etc.). The user may request for vehicle service from the vehicle information system by speaking into the mobile phone. The user's voice may be captured by the mobile phone and transmitted to the vehicle information platform, which applies the trained neural network model to identify the language. The vehicle information platform may provide various services based on the identified language: machine-replying a message to the user in the identified language, identifying a customer service person at least knowing the identified language to assist the user, identifying a vehicle driver at least knowing the identified language and sending the driver's information in a message to the user, etc.

Figure 1:
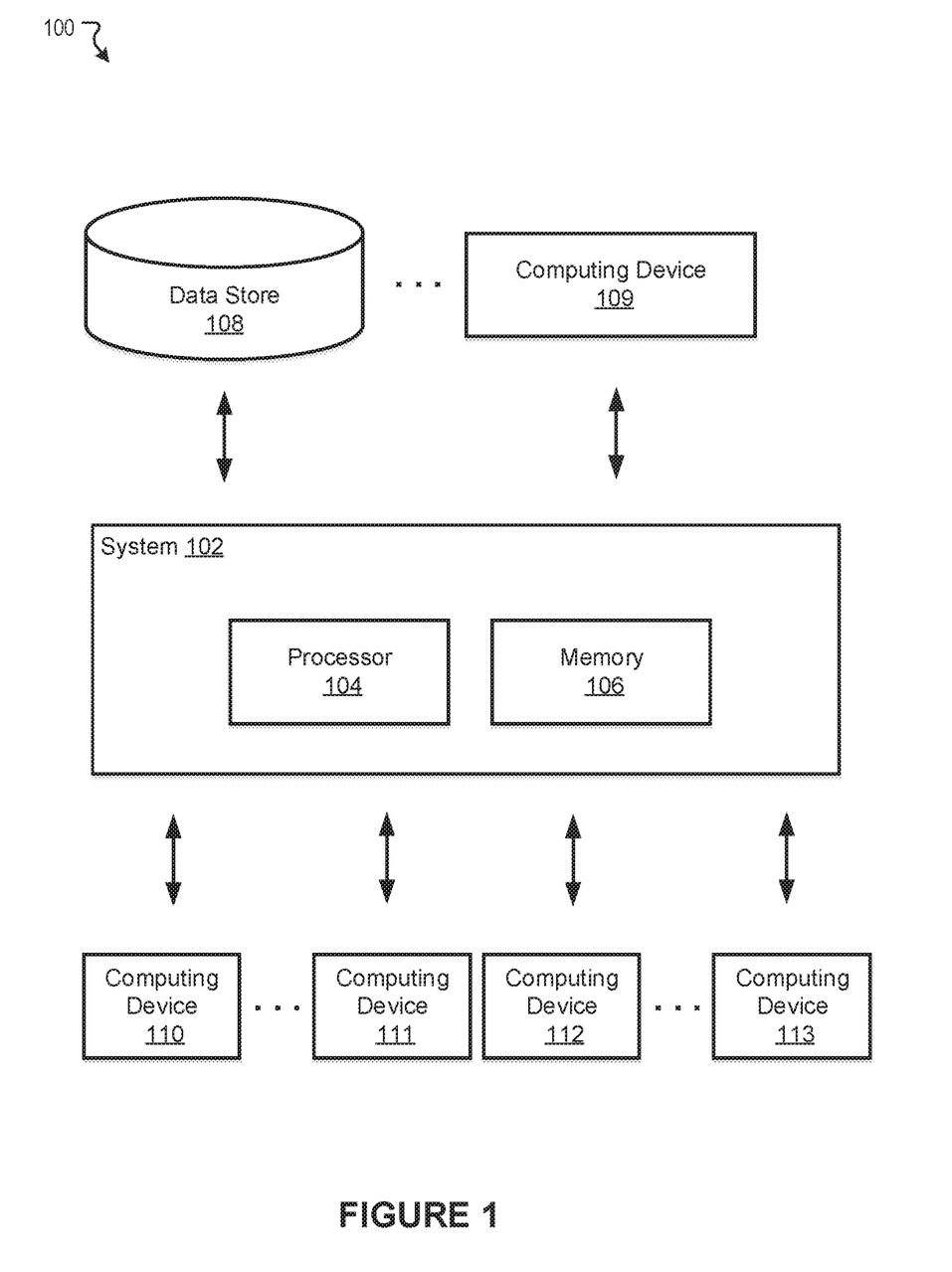
FIG. 1 illustrates an example environment for language-based service hailing, in accordance with various embodiments.

FIG. 1 illustrates an example environment 100 for language-based service hailing, in accordance with various embodiments. As shown in FIG. 1, the example environment 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein.

The environment 100 may include one or more data stores (e.g., a data store 108) and one or more computing devices (e.g., a computing device 109) that are accessible to the system 102. In some embodiments, the system 102 may be configured to obtain speech samples from the data store 108 and/or the computing device 109. For example, the computing device 109 may be a voice recorder, mobile phone, or computer configured to record a speech. The speech may be tagged with the corresponding language. The system may use the speech samples to train models for identifying languages of voice inputs.

The environment 100 may further include one or more computing devices 110, 111, 112, and 113 (e.g., cellphone, tablet, computer, wearable device (smart watch), etc.) coupled to the system 102. The computing devices may transmit or receive data (e.g., voice, text, video, information, etc.) to or from the system 102. In some embodiments, the system 102 may implement an online information or service platform. The computing devices 110 and 111 (and many more similar devices) may represent user devices accessing the service platform. The computing devices 112 and 113 (and other similar devices) may represent devices associated with or supporting the service platform. The computing devices above may be installed with appropriate software (e.g., Application, platform program, etc.) and/or hardware (e.g., wires, wireless connections, etc.) to access the system 102.

As a further example, the service may be associated with vehicles (e.g., cars, bikes, boats, airplanes, etc.), and the system 102 may be referred to as an information, service, or service hailing platform (e.g., a vehicle information platform providing information of vehicles, and the vehicle information can be provided by one party to service another party, shared by multiple parties, exchanged among multiple parties, etc.). Some platform data (e.g., vehicle information, vehicle driver information, language prowess of the vehicle driver, etc.) may be stored in the memory 106 or retrievable from the data store 108 and/or the computing device 109. The computing devices 110 and 111 may be associated with users of the platform (e.g., a user's cellphone installed with an Application of the platform). The computing devices 112 and 113 may be associated with operators of the platform (e.g., customer service personnel of the platform, etc.) and/or operators of the vehicles (e.g., drivers, schedulers, etc.).

Although the system 102 is shown as a single component in this figure, it is appreciated that the system 102 can be implemented as a single device or multiple devices (e.g., computers, servers, etc.) coupled together. For example, the system 102 may be implemented as a computer, a first server, and a second server coupled together, and the computer may be configured to obtain speech samples from the data store 108 and the computing device 109, the first server may be configured to interact with the computing devices 110 and 111, and the second server may be configured to interact with the computing devices 112 and 113.

In some embodiments, the system 102 and one or more of the computing devices (e.g., a computing device 112) may be integrated in a single device or system. Alternatively, the system 102 and the computing devices may operate as separate devices. For example, the computing devices 110, 111, 112, and 113 may be computers or mobile phones, and the system 102 may be a server. The data store(s) may be anywhere accessible to the system 102, for example, in the memory 106, in the computing device 109, 112, or 113, in another device (e.g., network storage device) coupled to the system 102, or another storage location (e.g., cloud-based storage system, network file system, etc.), etc. In general, the system 102, the computing devices 110, 111, 112, and 113, and the data store 108 may be able to communicate with one another through one or more wired or wireless networks (e.g., the Internet) through which data can be communicated. Various aspects of the environment 100 are described below in reference to FIG. 2 to FIG. 5.

Figure 2:
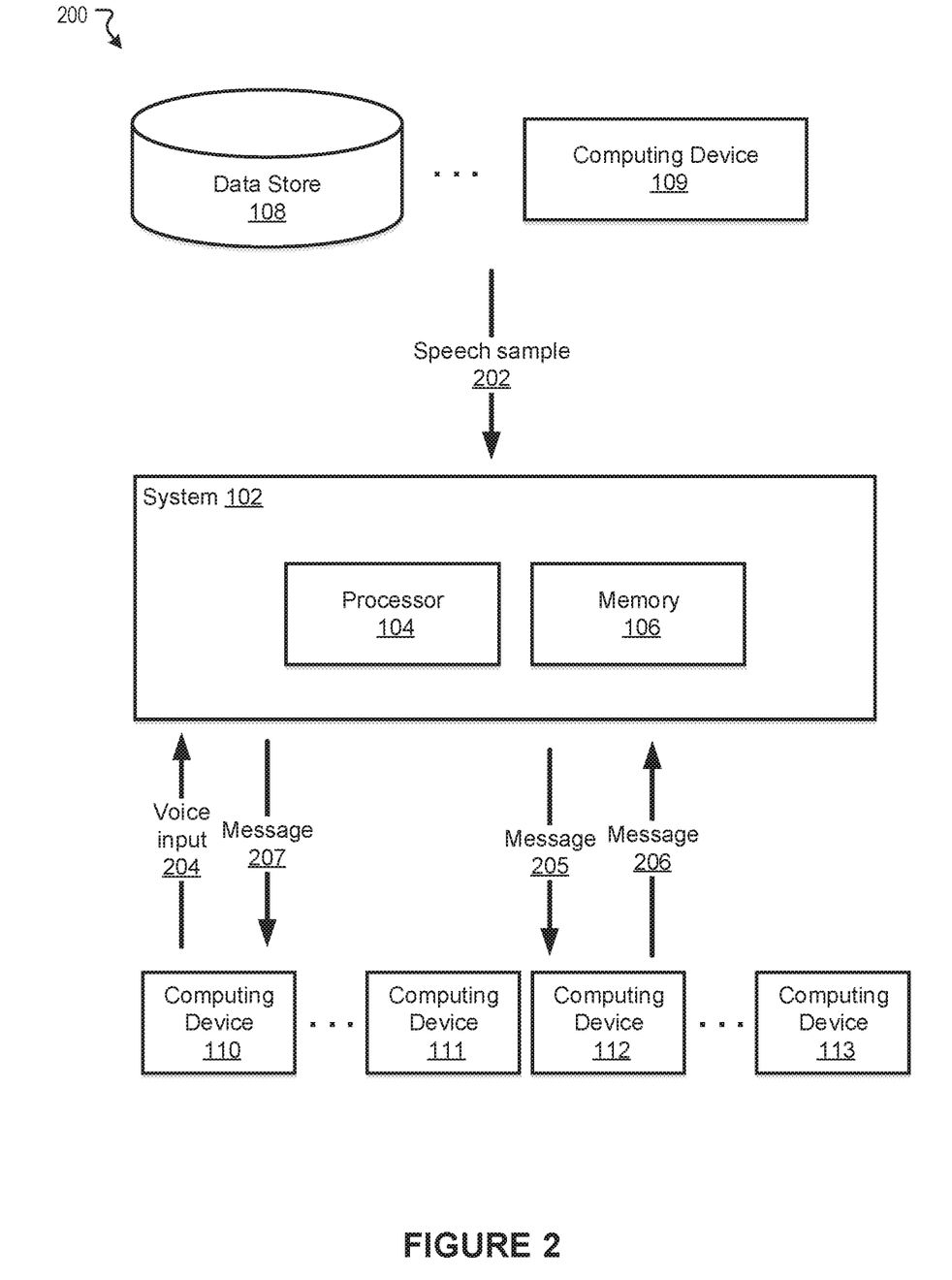
FIG. 2 illustrates an example system for language-based service hailing, in accordance with various embodiments.

FIG. 2 illustrates an example system 200 for language-based service hailing, in accordance with various embodiments. The operations shown in FIG. 2 and presented below are intended to be illustrative. In various embodiments, the system 102 may obtain a plurality of speech samples 202 from the data store 108 and/or the computing device 109. Each speech sample (e.g., a speech voice record) may comprise one or more words spoken in a language. The obtained speech sample may be stored in the memory 106. The system 102 may train a neural network model with the speech samples to obtain a trained model for determining languages of speeches. An example training is described below with references to FIG. 3.

Figure 3:
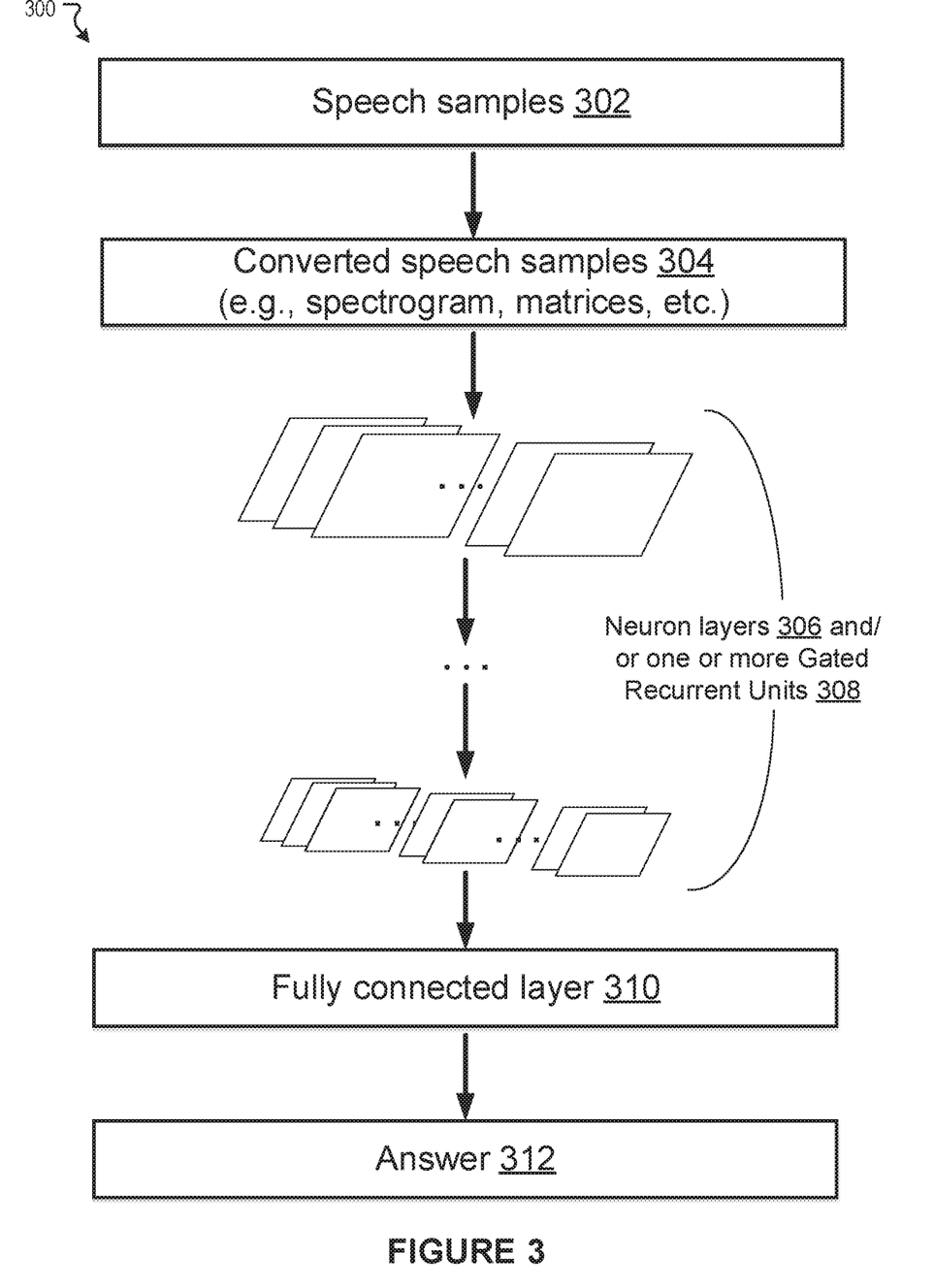
FIG. 3 illustrates an example training of a neural network model for language-based service hailing, in accordance with various embodiments.

Referring to FIG. 3, FIG. 3 illustrates an example training 300 of a neural network model for language-based service hailing, in accordance with various embodiments. The training 300 may be implemented in various environments including, for example, the environment 100 of FIG. 1. The training steps below may be implemented by one or more components of the system 102 (e.g., the processor 104, the memory 106). The description of FIG. 3 is intended to be illustrative and may be modified in various ways according to the implementation. A person skilled in the art would appreciate the description herein as to enable training of the model for language-based service hailing.

As shown in FIG. 3, the obtained speech samples 302 may be converted to an appropriate format for model training, if not already converted. The conversion may result in converted speech samples 304. In some embodiments, the speech samples 302 may be captured from microphones and stored as audio files (e.g., .WAV, .MP3, etc.). The converted speech samples 304 may be a spectrogram or an alternative representation. A spectrogram is a visual representation of the frequency spectrum of a sound signal. For example, an audio file can be converted to a 2D spectrogram with the x-axis representing the time or some other variable and the y-axis representing the frequency. Additionally, a z-axis can be used to represent the amplitude of the sound. Such spectrograms can also be represented mathematically (e.g., as matrices) for further processing and analysis. To obtain the time-frequency representation of spectrograms or matrices, at least two methods can be used: (1) approximation to band-pass filters, or (2) calculation from the time signal using Fourier transform.

In some embodiments, the system may be a vehicle information platform. As described above, the speech samples may comprise one or more phrases for starting a phone call conversation, such as "hi," "can you hear me," or "good morning," in various languages. The one or more phrases may comprise many more examples depending on the culture and user habits. Since each phrase of each language as represented by the spectrogram, matrix, or an alternative representation may correspond to a unique pattern, training the neural network model with the one or more phrases can allow the model to determine the language of a voice input by analyzing the frequency patterns. Thus, the automatic identification of the language of a voice input can be achieved efficiently by machine alone. Further, since the analysis of a reasonable portion of the voice input (e.g., the beginning of a voice input) can suffice the purpose of language identification, the demand for computing power can be kept non-burdening.

A neural network model may be trained with the converted speech samples 304. Since the language of the speech sample can be associated with or depend on local patterns of the spectrograms or similar representations, a neural network model is applicable and appropriate to achieve accurate language identification. The neural network model may comprise various examples, such as a convoluted neural network (CNN), a recurrent neural network (RNN), or a combination of both.

In one example of applying a CNN model, a person skilled in the art would appreciate the application of various mathematical transformation layers to the converted speech samples 304 layer by layer (the output of one layer fed to the input of another layer). Such layers may include the convolution layer, ReLU (Rectified Linear) layer, pooling layer, etc. The layers can also be referred to as neuron layers 306 that process information as if biological neurons. Each convolution layer can be an application of a preset filter across a previously processed speech sample. Each ReLU layer can be an application of a non-saturating function across a previously processed speech sample. Each pooling layer can be an application of a pooling window of a preset window size and stride across a previously processed speech sample. Various configurations of the filters and neurons such as the number of filters, size of the filter, pooling window size, pooling window stride, and number of neurons can be preset. Each layer may be applied for one or more times in a preset order to obtain a fully connected layer 310. The fully connected layer 310 may comprise multiple fields connected to an answer 312 to the identity of the language of the speech sample. For example, the fully connect layer 310 may comprise multiple fields each corresponding to a language, and each field value may correspond to a probability that the language corresponds to the speech sample. Since the real language of the speech samples are known, the accuracy of a trained model can be determined by comparing the answer 312 (determined language) with the known language, and the various configurations can be tuned to improve the accuracy level.

In one example of applying a CNN and RNN combination model, before obtaining the fully connected layer, one or more Gated Recurrent Units (GRUs) 308 may be applied to each channel output of the CNN neural network model. The one or more GRUs can be used to gate the results of the previous layer processing and improve the accuracy of the fully connect layer to achieve better determination. As such, the neural network model can be trained with the speech samples to accurately identify the language of a voice input.

Referring back to FIG. 2, the trained model can be applied in language-based service hailing. The computing devices 110 and 111 may be associated with users of the platform (e.g., a user's cellphone installed with an Application of the platform, e.g., Application for hailing a vehicle). The computing devices 112 and 113 may be associated with operators of the platform (e.g., customer service personnel of the platform, etc.) and/or operators of the vehicles (e.g., drivers, schedulers, etc.). In some embodiments, the system 102 may be an online (vehicle) service platform and a user may use the Application of the computing device 110 to contact the platform (e.g., for hailing a vehicle, for making a complaint, for making an inquiry, etc.). The computing device 110 may capture a voice input 204 of the user and transmit the system 102, or the system 102 may directly capture such voice input. For efficiency and cost reasons, the contact may be received and handled by a machine at the system 102's end instead of a human. At this stage, the language of the user is to be identified based on the voice input 204.

As described above, with the trained neural network model, the system 102 may apply the model to the voice input 204 to determine the language corresponding to the voice. For example, the voice input 204 may be converted to a spectrogram and processed as discussed above to obtain an answer (a determined language of the voice input 204). In some embodiments, the determination of the language corresponding to the voice can be determined based on the voice input and various other factors to further enhance the accuracy.

In one example, similar to the voice input 204, an image and/or a video of a user associated with the voice input can be obtained from the computing device 110 (e.g., as the user uploads an image of himself/herself or uploads a video while inputting the voice). Alternatively, the Application of computing device 110 may automatically turn on the camera to record a video or take a picture of the user when user opens the Application. The system 102 may determine a first set of candidate languages based on the image and/or the video. For example, to determine the first set of candidate languages, the system 102 may apply (machine learning) methods such as image matching, image segmentation, and/or image recognition to extract various features that commonly associate with various languages, such as facial feature (e.g., people of certain facial features are associated with certain races speaking certain languages), posture (e.g., people speaking certain languages predominantly use certain hand signs), outfit or an item carried by the user (e.g., certain brands of clothing are unique to a certain nation speaking certain languages), surrounding environment (e.g., a background of Eiffel Tower would indicate French as the first candidate language), or conspicuous object (e.g., languages used on a name tag worn by the user may comprise the first candidate languages, an insignia worn by the user can be used to identify the country or organization affiliation of the user and associated languages). Each of the first set of candidate languages may have a corresponding weight depending on factors such as the probability of the language association.

In another example, similar to the voice input 204, a location of the user can be obtained from the computing device 110 (e.g., the computing device 110 may comprise a global positioning module that tracks the location of the computing device in real-time and uploads the location to the system 102). The system 102 may determine a second set of candidate languages based on the location. The location can comprise the current country, state/province, region, or another area of the user, each geographic range being commonly associated with one or more languages and/or dialects. Each of the second set of candidate languages or dialects may have an associated weight depending on factors such as the population speaking the language or dialect. For example, a location in United States may render English and Spanish as two of the second set of candidate languages, with English having a larger weight (or probability) than Spanish. The first and second sets of candidate languages are not mutually exclusive, and overlaps may occur.

In some embodiments, the system 102 may identify a language corresponding to the voice (of the voice input 204) based on applying the trained model to the voice input, on the first set of candidate languages, and/or on the second set of candidate languages. There can be various methods to implement the identification. In one example, the first and second sets of languages can also be used as inputs to the neural network model described above to enhance the accuracy of the language determination. The various configurations of the filters and neurons such as the number of filters, size of the filter, pooling window size, pooling window stride, and number of neurons can be preset, in turn, according to the first and second sets of candidate languages in a decreasing probability to process the speech samples with the neural network model. Accordingly, the answer 312 obtained in this case would be even more accurate or be obtained more quickly than that obtained without factoring in the first and second sets of candidate languages. In another example, the language determined by applying the trained model to the voice input, the first set of candidate languages, and the second set of candidate languages can be weighted to obtain the language of the voice. Each weight may be preset and adjustable. For example, the language determined by applying the trained model may be given the largest weight because it directly analyzes the voice input.

With the answer (determined based on applying the trained model to the voice input, on the first set of candidate languages, and/or on the second set of candidate languages), the system 102 may implement various steps to service the user. In some embodiments, the system 102 may communicate a preset message 207 in the identified language to the computing device 110. In some other embodiments, the system 102 may identify from a database a person at least knowing the identified language to service the user. For example, the system 102 may identify a computing device 112 associated with a customer service member speaking the identified language, and communicate a message 205 to the computing device 112 to inform the customer service member of the voice input 204. Accordingly, the customer service member may communicate a message 206 to the system 102, which can be relayed to the computing device 110 as a message 207 to service the user. In some other embodiments, the system 102 may be a vehicle information platform accessible to the computing device 110 through an application. A user may request for vehicle service from the vehicle information platform by speaking into the computing device 110. The user's voice may be captured by the vehicle information platform, which applies the trained neural network model to identify the language. The vehicle information platform may further identify from a database a vehicle driver at least knowing the identified language and send the driver's information in a message 207 to the user. In some cases, the vehicle information platform may further analyze the content of the voice input 204 and identify one or more drivers fitting the user's request (e.g., a request for car service in the vicinity of the user) from a pool of drivers matching the language. Alternatively, the vehicle information platform may send a message 205 to the identified vehicle driver at the computing device 112 to convey the user's request. The message 205 may be a direct copy of the voice input 204. The driver may then contact the user directly or through the vehicle information platform. The messages 205, 206, and 207 above may comprise voice, text, video, image, etc.

As such, users' requests can be automatically analyzed by machines to identify the language used. Accordingly, the system can determine the appropriate language-based services to provide to the user. The user would have a seamless experience without any hassle for navigating through language options. Further, with the language-identification capability, the system can scale its service globally.

Figure 4:
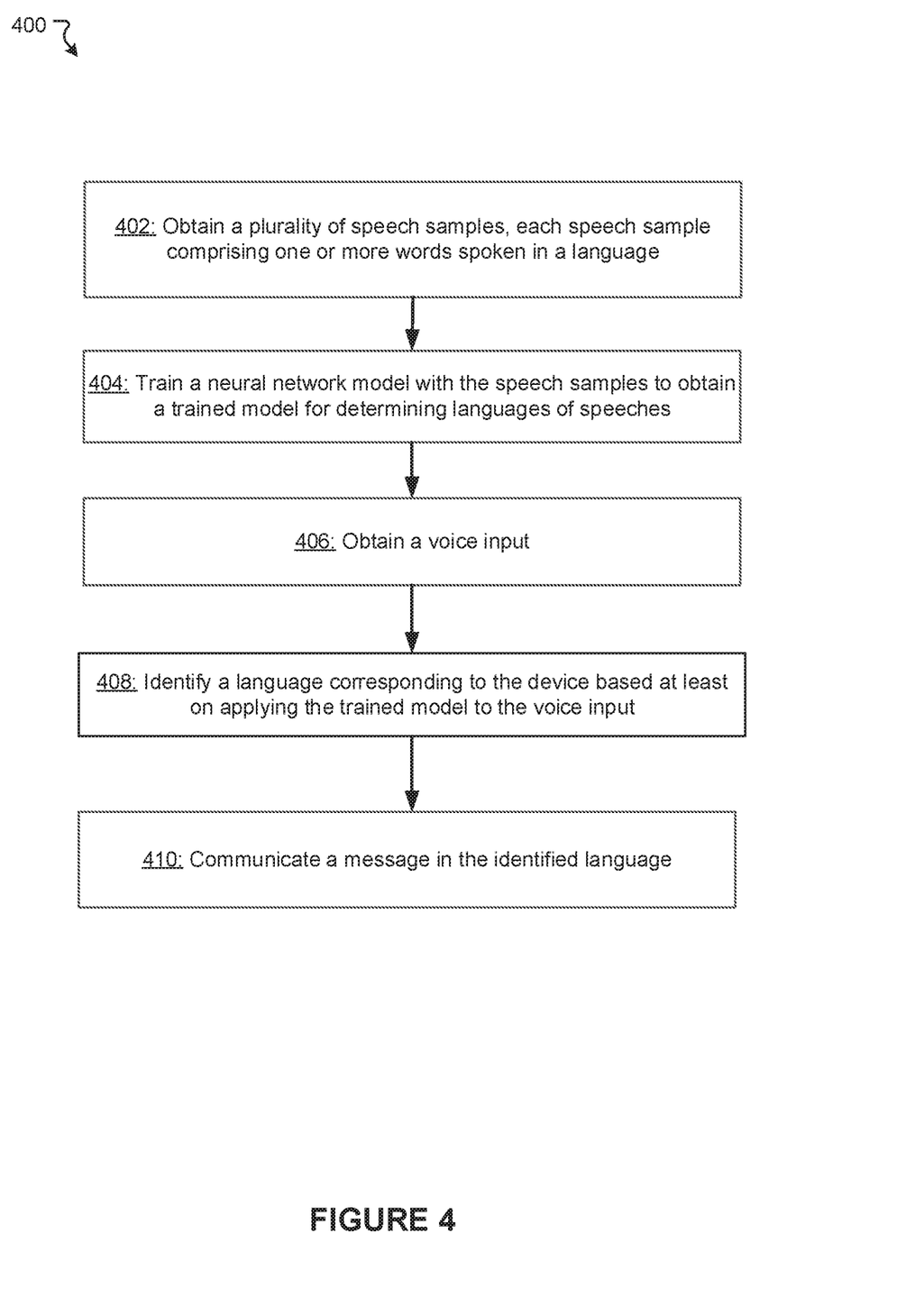
FIG. 4 illustrates a flowchart of an example method for language-based service hailing, in accordance with various embodiments.

FIG. 4 illustrates a flowchart of an example method 400, according to various embodiments of the present disclosure. The method 400 may be implemented in various environments including, for example, the environment 100 of FIG. 1. The example method 400 may be implemented by one or more components of the system 102 (e.g., the processor 104, the memory 106). The example method 400 may be implemented by multiple systems similar to the system 102. For example, blocks 402-404 describe below may be implemented by a first system, and blocks 406-410 described below may be implemented by a second system coupled to the first system. The operations of method 400 presented below are intended to be illustrative. Depending on the implementation, the example method 400 may include additional, fewer, or alternative steps performed in various orders or in parallel.

At block 402, a plurality of speech samples may be obtained, each speech sample comprising one or more words spoken in a language. At block 404, a neural network model may be trained with the speech samples to obtain a trained model for determining languages of speeches. At block 406, a voice input may be obtained. In some embodiments, optionally, at least one of an image or a video of a user associated with the voice input, and/or a location of the user. Optionally, one or more first candidate languages may be determined based on at least one of the image or the video, and one or more second candidate languages may be determined based on the location. At block 408, a language corresponding to the voice may be identified based at least on applying the trained model to the voice input, on the one or more first candidate languages, and/or on the one or more second candidate languages. At block 410, a message may be communicated in the identified language.

In some embodiments, a method for language-based service hailing may comprise the following steps: obtaining a voice input, identifying a language corresponding to the voice based at least on applying a trained neural network model to the voice input, and communicating a message in the identified language. The trained neural network model has been trained with a plurality of speech samples to determine languages of speeches, and each of the speech samples comprises one or more words spoken in a language The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
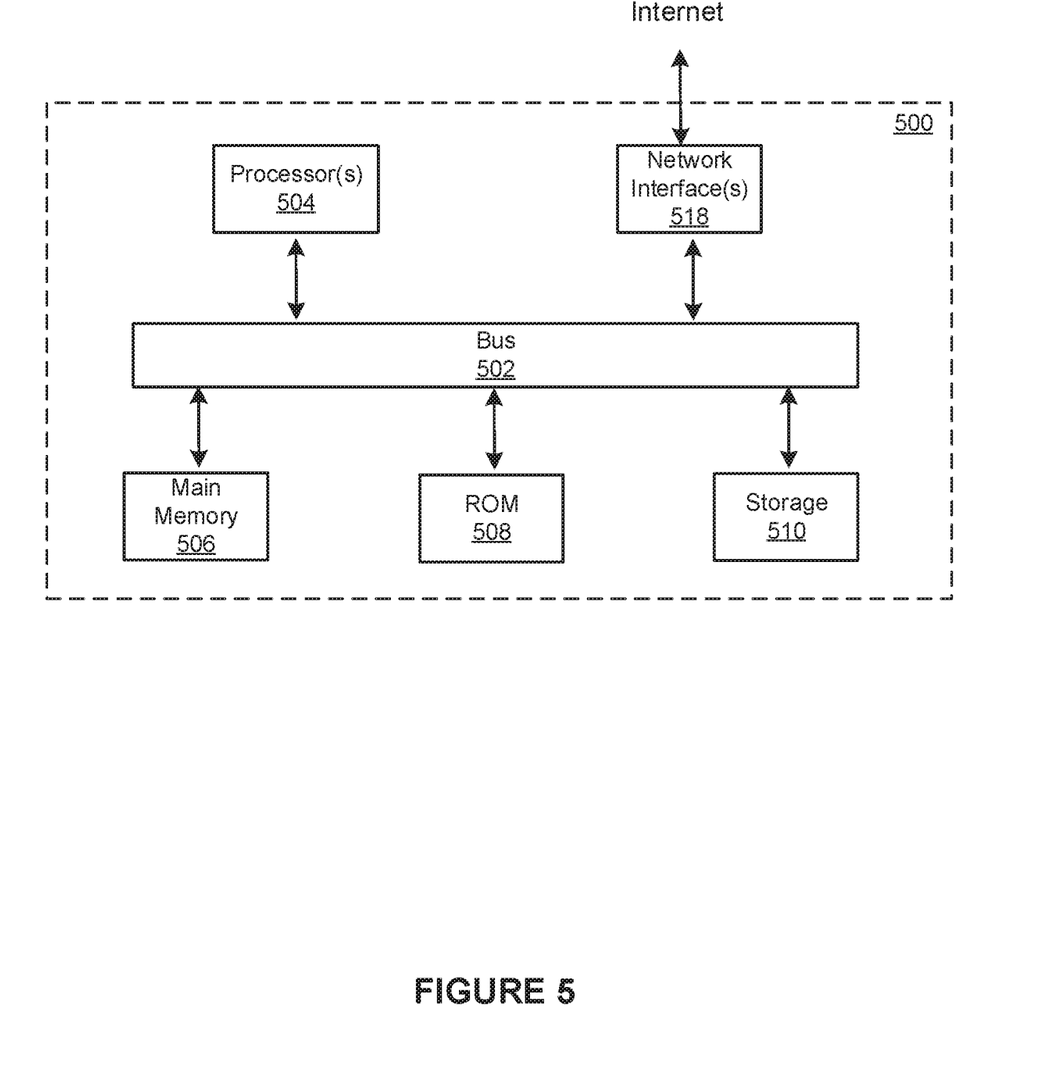
FIG. 5 illustrates a block diagram of an example computer system in which any of the embodiments described herein may be implemented.

FIG. 5 is a block diagram that illustrates a computer system 500 upon which any of the embodiments described herein may be implemented. The system 500 may correspond to the system 102 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

The various operations of example methods described herein may be performed, at least partially, by one or more processors that are temporarily configured (e.g., by software) or permanently configured to perform the relevant operations.

Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The invention claimed is:

1. A computing system for language-based service hailing, comprising:
   one or more processors; and
   a memory storing instructions that, when executed by the one or more processors, cause the computing system to:
      obtain speech samples, each of the speech samples comprising one or more words spoken in a language;
      train a neural network model with the speech samples;
      obtain a voice input and an image of a user associated with the voice input;
      extract features from the image of the user, wherein the features include one or more of: a facial feature of the user, a posture of the user, an outfit of the user, a surrounding environment, conspicuous text, or an insignia worn by the user;
      determine a first set of candidate languages based on the extracted features;
      adjust configurations of the trained neural network model based on the determined first set of candidate languages, wherein the configurations comprise a number of filters in the trained neural network model, a size of the filters, a pooling window size in the trained neural network model, a pooling window stride, and a number of active neurons;
      identify a language corresponding to the voice input based at least on applying the adjusted trained neural network model to the voice input; and
      communicate a message in the identified language.

2. The system of claim 1, wherein:
   to train the neural network model with the speech samples, the instructions cause the system to convert the speech samples to spectrograms and train the neural network model with the spectrograms.

3. The system of claim 1, wherein:
   the neural network model comprises a convoluted neural network (CNN) configured to transform the voice input by multiple layers to determine its language, and comprises one or more Gated Recurrent Units (GRUs) applied to each channel output of the CNN.

4. The system of claim 1, wherein:
   before identifying the language corresponding to the voice input, the computing system is further caused to:

obtain a location of the user associated with the voice input; and determine a second set of candidate languages based on the location; and to adjust the configurations of the trained neural network model, the computing system is caused to adjust the configurations of the trained neural network model based on the determined first set of candidate languages and the determined second set of candidate languages.

5. The system of claim 1, wherein:

the system is coupled to a computing device; and the computing device comprises a microphone configured to receive the voice input and transmit the received voice input to the one or more processors.

6. The system of claim 5, wherein:

the message comprises at least one of a voice or a text; and to communicate the message in the identified language, the instructions cause the system to perform at least one of playing the message via the computing device or identifying a person at least knowing the identified language to play the message.

7. The system of claim 5, wherein:

the computing device is a mobile phone associated with the user;

the system is a vehicle information platform; and the message is associated with a vehicle for servicing the user.

8. The system of claim 1, wherein:

the one or more words comprise one or more phrases for starting a phone call conversation; and the one or more phrases comprise "hi" in various languages.

9. A method for language-based service hailing, comprising:

obtaining a voice input and an image of a user associated with the voice input;

extracting features from the image of the user, wherein the features include one or more of: a facial feature of the user, a posture of the user, an outfit of the user, a surrounding environment, conspicuous text, or an insignia worn by the user;

determining a first set of candidate languages based on the extracted features;

adjusting configurations of a trained neural network model based on the determined first set of candidate languages, wherein the trained neural network model is trained based on speech samples spoken in a plurality of languages, and the configurations comprise a number of filters in the trained neural network model, a size of the filters, a pooling window size in the trained neural network model, a pooling window stride, and a number of active neurons;

identifying a language corresponding to the voice input based at least on applying the adjusted trained neural network model to the voice input; and communicating a message in the identified language.

10. The method of claim 9, wherein:

applying the adjusted trained neural network model to the voice input comprises converting the speech samples to spectrograms and inputting the spectrograms into the adjusted trained neural network model.

11. The method of claim 9, wherein:

the neural network model comprises a convoluted neural network (CNN) configured to transform the voice input by multiple layers to determine its language, and comprises one or more Gated Recurrent Units (GRUs) applied to each channel output of the CNN.

12. The method of claim 9, wherein:

before identifying the language corresponding to the voice input, the method further comprises:

obtaining a location of the user associated with the voice input; and determining a second set of candidate languages based on the location; and the adjusting the configurations of a trained neural network model comprises adjusting the configurations of the trained neural network model based on the first set of candidate languages and the second set of candidate languages.

13. The method of claim 9, wherein:

the obtaining the voice input comprises: obtaining, by a system coupled to a computing device, the voice input; and the computing device comprises a microphone configured to receive the voice input and transmit the received voice input to the system.

14. The method of claim 13, wherein:

the message comprises at least one of a voice or a text; and communicating the message in the identified language comprises at least one of playing the message via the computing device or identifying a person at least knowing the identified language to play the message.

15. The method of claim 13, wherein:

the computing device is a mobile phone associated with the user;

the system is a vehicle information platform; and the message is associated with a vehicle for servicing the user.

16. The method of claim 9, wherein:

each of the speech samples comprise one or more phrases for starting a phone call conversation; and the one or more phrases comprise "hi" in various languages.

17. A non-transitory computer-readable medium for language-based vehicle hailing, comprising instructions stored therein, wherein the instructions, when executed by one or more processors, cause the one or more processors to perform:

obtaining a voice input, at least one of an image or a video of a user associated with the voice input, and a location of the user;

extracting features from the image or the video of the user, wherein the features include one or more of: a facial feature of the user, a posture of the user, an outfit of the user, a surrounding environment, conspicuous text, or an insignia worn by the user;

determining a first set of candidate languages based on the extracted features;

adjusting configurations of a trained neural network model based on the determined first set of candidate languages, wherein the trained neural network model is trained based on speech samples spoken in a plurality of languages, and the configurations comprise a number of filters in the trained neural network model, a size of the filters, a pooling window size in the trained neural network model, a pooling window stride, and a number of active neurons; and identifying a language corresponding to the voice input based at least on applying the adjusted trained neural network model to the voice input.

18. The medium of claim 17, wherein:

the voice input comprises a request for a vehicle service.

* * * * *